US012662974B2

(12) United States Patent
Kiwan et al.

(10) Patent No.: US 12,662,974 B2
(45) Date of Patent: Jun. 23, 2026

(54) METHODS AND SYSTEMS FOR INDIVIDUAL CYLINDER FUEL-AIR RATIO ADAPTATION

(71) Applicant: Ford Global Technologies, LLC, Dearborn, MI (US)

(72) Inventors: Rani Kiwan, West Bloomfield, MI (US); Michael Uhrich, Wixom, MI (US); Chris Paul Glugla, Macomb, MI (US); Kenneth John Behr, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/889,955

(22) Filed: Sep. 19, 2024

(65) Prior Publication Data

US 2026/0078712 A1 Mar. 19, 2026

(51) Int. Cl.

*F02D 41/30* (2006.01)
*F02D 41/00* (2006.01)

(52) U.S. Cl.

CPC ...... *F02D 41/3011* (2013.01); *F02D 41/0087* (2013.01)

(58) Field of Classification Search

CPC ............. F02D 41/3011; F02D 41/0087; F02D 41/1454; F02D 41/1441; F02D 41/1475
See application file for complete search history.

(56) References Cited

U.S. PATENT DOCUMENTS

| | | | | |
|---|---|---|---|---|
| 5,706,793 | A | 1/1998 | Orzel et al. | |
| 6,382,198 | B1 * | 5/2002 | Smith | F02D 41/1454 123/674 |
| 6,568,177 | B1 * | 5/2003 | Surnilla | F02D 41/0087 123/481 |
| 6,735,938 | B2 * | 5/2004 | Surnilla | F02D 41/0087 123/406.47 |
| 10,018,144 | B2 | 7/2018 | Ranga et al. | |
| 11,313,310 | B1 * | 4/2022 | Kiwan | F02D 41/20 |
| 2003/0221667 | A1 | 12/2003 | Surnilla | |
| 2005/0161033 | A1 | 7/2005 | Okamoto et al. | |
| 2019/0271278 | A1 * | 9/2019 | Surnilla | F02D 41/3076 |

FOREIGN PATENT DOCUMENTS

| | | | | |
|---|---|---|---|---|
| CN | 113550837 | A | 10/2021 | |
| DE | 102008048626 | A1 * | 4/2009 | F01L 9/20 |

OTHER PUBLICATIONS

Kiwan, R. et al., "Methods and Systems for V8 Engine Fuel Control," U.S. Appl. No. 18/793,530, filed Aug. 2, 2024, 30 pages.

* cited by examiner

*Primary Examiner* — Grant Moubry
*Assistant Examiner* — James G Moubry
(74) *Attorney, Agent, or Firm* — McCoy Russell LLP

(57) ABSTRACT

Systems and methods for determining normalized fuel-air ratio error for a cylinder of an engine an engine are disclosed. In one example, the engine is operated in a four-cylinder mode to generate a first normalized fuel-air ratio error for a first cylinder and operated in an eight-cylinder mode to generate a second normalized fuel-air ratio error for a second cylinder.

10 Claims, 4 Drawing Sheets

V8 mode Firing order: 1-3-7-2-6-5-4-8

V4 mode Firing order: 1-7-6-4

METHODS AND SYSTEMS FOR INDIVIDUAL CYLINDER FUEL-AIR RATIO ADAPTATION

FIELD

The present description relates to a system and methods for adapting fuel-air ratio for an engine. The methods may be particularly useful for V8 engines.

BACKGROUND AND SUMMARY

Engine designs as well as component manufacturing variation may lead to variation in air-fuel ratios between cylinders of an internal combustion engine. Variation between air-fuel ratios of engine cylinders may lead to increased vehicle emissions. Therefore, administrative agencies may mandate air-fuel imbalance monitoring. Past cylinder air-fuel management systems have relied upon a sole oxygen sensor positioned downstream of an entire bank of cylinders and upstream of a catalyst to control air-fuel ratios for the bank of cylinders. However, exhaust gas mixing within the engine's exhaust system and stricter emissions mandates may make it much more difficult to meet monitoring standards and emissions standards via sole oxygen sensor that is located upstream of catalysts in the engine's exhaust system. Further, the engine's crankshaft design may make it more difficult to accurately determine an air-fuel ratio that a particular cylinder is operating with. In particular, V8 engines having cross-plane crankshafts may exhibit uneven firing intervals between cylinders of a cylinder bank (e.g., 90 degrees, 180 degrees, and 270 degrees). The uneven firing intervals may make for unequal residency times for exhaust pulses at an oxygen sensor of a cylinder bank leading to errors in an air-fuel ratio imbalance monitor signal.

The inventors herein have recognized the above-mentioned disadvantages and have developed a method for operating an engine, comprising: operating the engine in a four-cylinder mode and generating a first normalized fuel-air ratio error for a first cylinder via a first feedback correction value generated from an oxygen sensor output produced while operating the engine in the four-cylinder mode; operating the engine in an eight-cylinder mode and generating a second normalized fuel-air ratio error for a second cylinder via the first normalized fuel-air ratio error and a second feedback correction value generated from the oxygen sensor output produced while operating the engine the eight-cylinder mode; and adjusting output of one or more fuel injectors in response to the first normalized fuel-air ratio error or the second normalized fuel-air ratio error.

By operating an engine in a four-cylinder mode and an eight-cylinder mode, it may be possible to generate a first normalized fuel-air ratio error for a first cylinder of an engine and a second normalized fuel-air ratio error for a second cylinder of the engine via a single oxygen sensor. The first and second normalized fuel-air ratio errors may be a basis for adjusting fuel injection to the first cylinder and the second cylinder. A solution to a first equation describing the first normalized fuel-air ratio error while operating the engine in four-cylinder mode may be applied to solve a second equation describing the second normalized fuel-air ratio error while operating the engine in eight-cylinder mode.

The present description may provide several advantages. In particular, the approach may simplify correcting for normalized cylinder fuel-air ratio errors. Further, the approach is applicable to port fuel injected engines, direct fuel injected engines, and port and direct fuel injected engines. The approach is also applicable to engines having cross-plane crankshafts.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
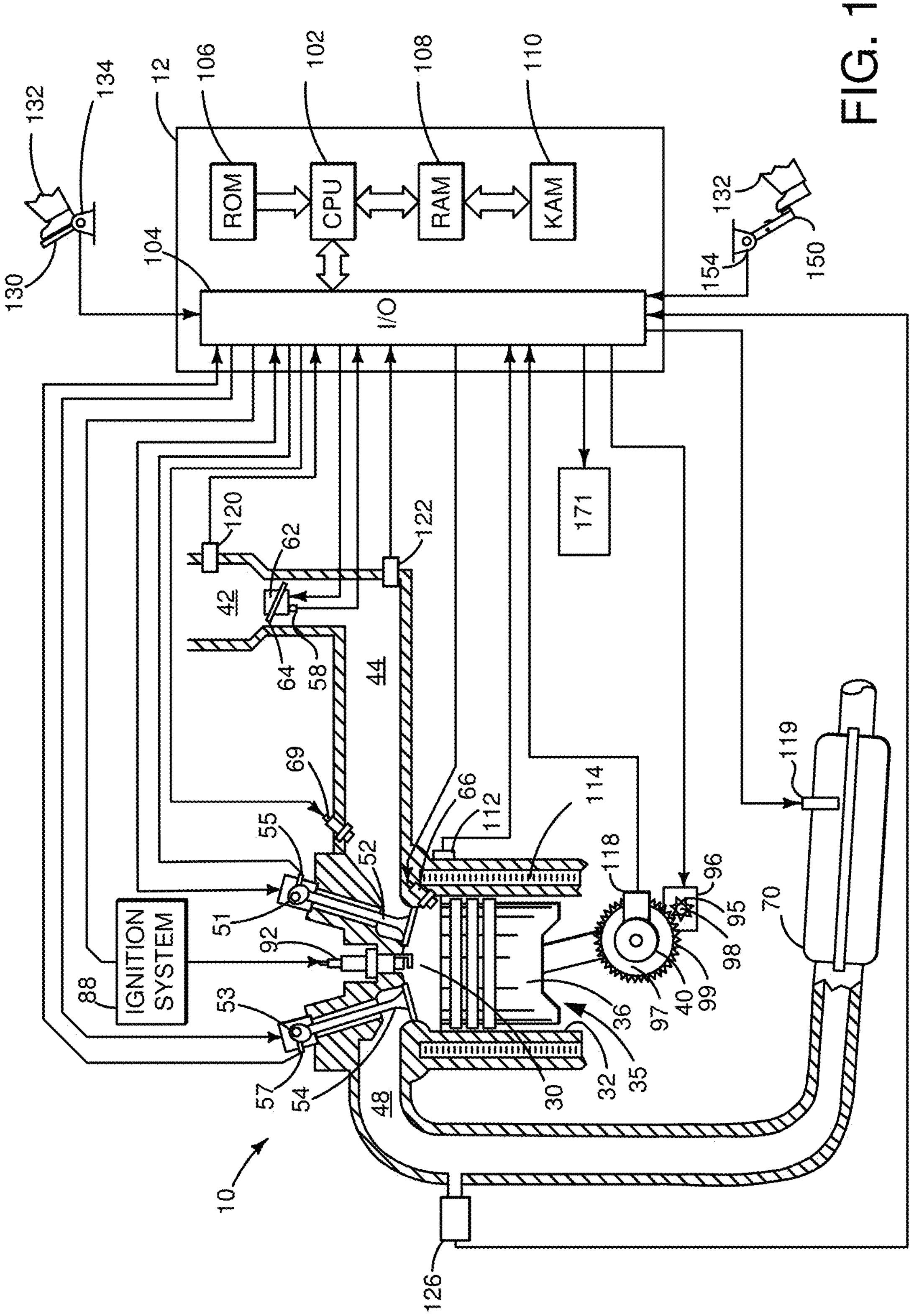
FIG. 1 is a schematic diagram of a single cylinder of an engine.
Figure 2B:
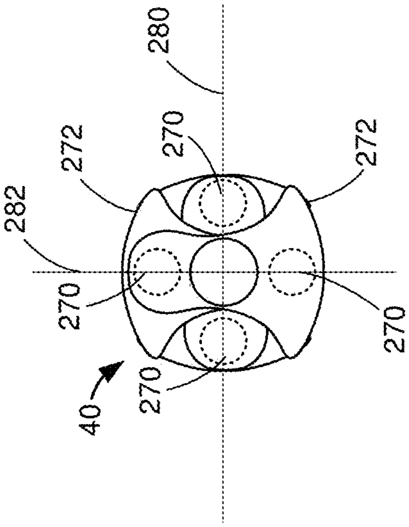
FIG. 2B is a schematic diagram of an end view of an example cross-plane crankshaft.
Figure 2A:
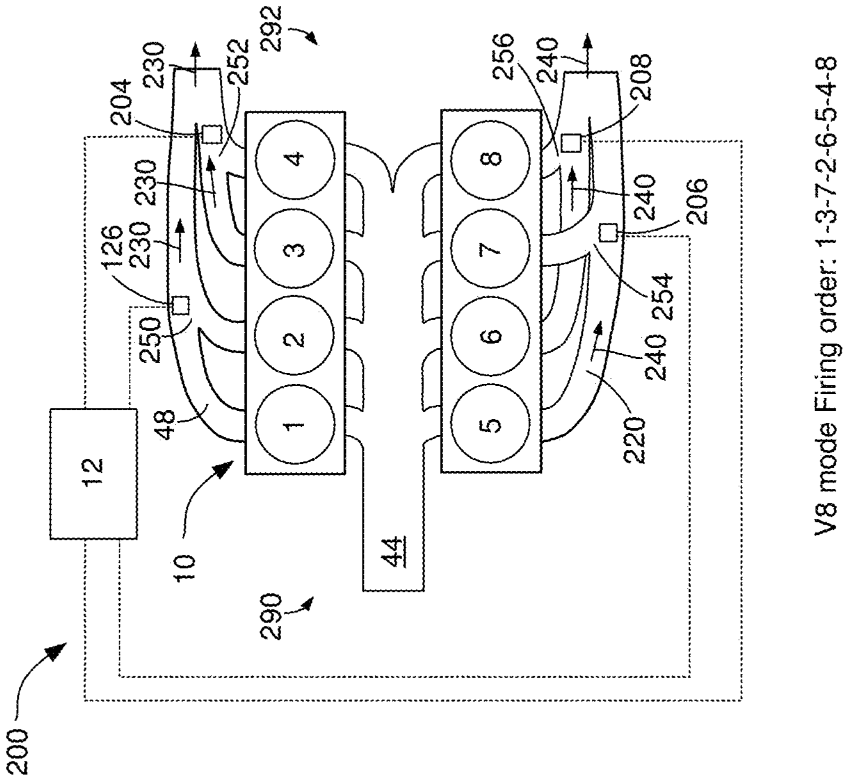
FIG. 2A is a schematic diagram of an eight-cylinder engine having a cross-plane crankshaft.
Figure 3:
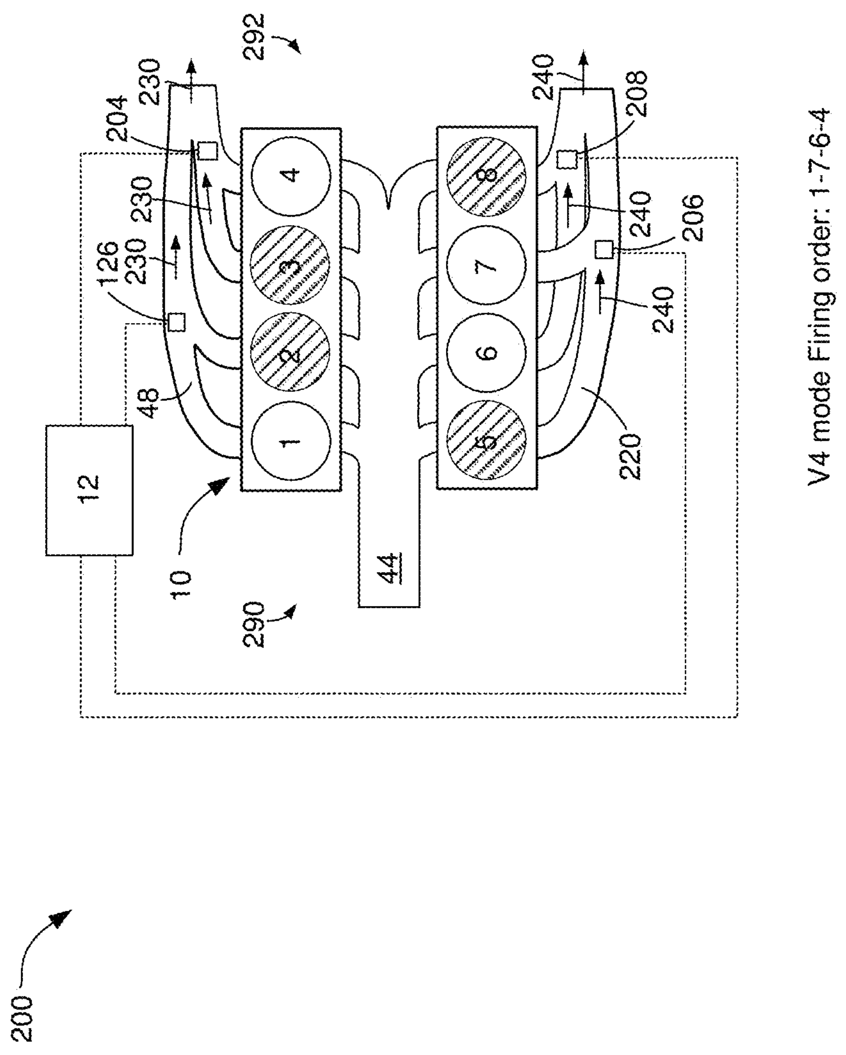
FIG. 3 is a schematic diagram of the eight-cylinder engine having a cross-plane crankshaft operating in four-cylinder mode.

The present description is related to determining fuel-air ratio errors for two different engine cylinders of an engine via a single or sole oxygen sensor. The fuel-air ratio errors may be a basis for adjusting fuel supplied to the two different cylinders and monitoring operation of engine cylinders. The engine may be an internal combustion engine that includes eight cylinders, one of which is shown in FIG. 1. The engine may include a cross-plane crankshaft as shown in FIGS. 2A-3. The engine may be operated and monitored according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 35, which is known to those skilled in the art as direct injection. Direct fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown). Alternatively, or in addition, engine 10 may also include a port fuel injector 69 for each cylinder, which is known to those skilled in the art as port fuel injection. Port fuel injector 69 delivers liquid fuel in proportion to a voltage pulse width or fuel injector pulse width of a signal from controller 12. Fuel may be supplied to port fuel injector 69 via the fuel system (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a distance displaced by human 132; a position sensor 154 coupled to caliper control pedal 150 for sensing distance displaced by human 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

In some examples, the engine may be coupled to an electric motor/battery system in a hybrid vehicle. Further, controller 12 may receive input and communicate conditions such as degradation of components to illuminate a light, or alternatively, to human/machine interface 171 (touch screen display and input device).

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, a plan view 200 of engine 10 is shown. Engine 10 is the same engine as shown in FIG. 1, but in FIG. 2A, all engine cylinders are shown. In this example, the engine's cylinders are numbered 1 through 8 and engine 10 includes a cross-plane crankshaft that is not shown in FIG. 2A, but the cross-plane crankshaft is shown in FIG. 2B. The cylinders are supplied with air via intake manifold 44. A first bank of cylinders includes cylinders 1-4 and a second bank of cylinders includes cylinders 5-8. Cylinders 1-4 are shown in fluidic communication with exhaust manifold 48 and cylinders 5-8 are shown in fluidic communication with exhaust manifold 220. Each of cylinders 1-8 includes fuel injectors, spark plug, and intake/exhaust valves as shown in FIG. 1.

A first oxygen sensor 126 is shown configured to sense exhaust gases from cylinders numbered 1 and 2 at exhaust gas confluence location 250 for cylinder numbers 1 and 2. A second oxygen sensor 204 is shown configured to sense exhaust gases from cylinders 3 and 4 at exhaust gas confluence location 252 for cylinder numbers 3 and 4. A third oxygen sensor 206 is shown configured to sense exhaust gases from cylinders numbered 5 and 7 at exhaust gas confluence location 254 for cylinder numbers 5 and 7. A fourth oxygen sensor 208 is shown configured to sense exhaust gases from cylinders 6 and 8 at exhaust gas confluence location 256 for cylinder numbers 6 and 8. There are no cylinders that are downstream of any of the exhaust gas sensors according to exhaust flow from the cylinders as indicated by arrows 230 and 240.

Output of first oxygen sensor 126 may be applied as fuel-air ratio feedback for controlling fuel that is supplied to cylinders numbered 1 and 2 via port and/or direct fuel injectors. Output of second oxygen sensor 204 may be applied as fuel-air ratio feedback for controlling fuel that is supplied to cylinders numbered 3 and 4 via port and/or direct fuel injectors. Output of third oxygen sensor 206 may be applied as fuel-air ratio feedback for controlling fuel that is supplied to cylinders numbered 5 and 7 via port and/or direct fuel injectors. Output of fourth oxygen sensor 208 may be applied as fuel-air ratio feedback for controlling fuel that is supplied to cylinders numbered 6 and 8 via port and/or direct fuel injectors. Thus, first oxygen sensor 126 is associated with cylinders numbered 1 and 2, second oxygen sensor 204 is associated with cylinders numbered 3 and 4, third oxygen sensor 206 is associated with cylinders numbered 5 and 7, and fourth oxygen sensor 208 is associated with cylinders numbered 6 and 8.

Referring now to FIG. 2B, crankshaft 40 is shown as a cross-plane crankshaft. FIG. 2B is an end view of crankshaft 40 and it shows how crankpins 270 are shown in a two planes. In this view, crankpins 270 are shown in a horizontally aligned first plane 280 and in a vertically aligned in a second plane 282. Crankshaft 40 also includes counterweights 272 as indicated. Engines having cross-plane crankshafts have crankpins that with 90 degrees of separation whereas flat-plane crankshafts have crankpins with 180 degrees of separation.

Referring now to FIG. 3, engine 10 is shown again as an engine with a cross-plane crankshaft. However, in this view, engine 10 is shown in a four-cylinder operating mode where four cylinders 1, 4, 6, and 7 are active cylinders (e.g., combusting fuel and air) and cylinders 2, 3, 5, and 8 are indicated as deactivated cylinders (e.g., not inducting air, nor combusting fuel and air due to deactivated intake and exhaust valves). The inactive cylinders are indicated with hatching. It may be appreciated that engine 10 may be operated in an alternative V4 mode where cylinders 2, 3, 5, and 8 are activated and cylinders 1, 4, 6, and 7 are deactivated.

The system of FIGS. 1-3 provides for a system, comprising: an internal combustion engine comprising eight cylinders, an exhaust system, a first group of eight fuel injectors, and four exhaust gas oxygen sensors, a first oxygen sensor positioned in the exhaust system downstream of a first group of two cylinders, a second oxygen sensor positioned in the exhaust system downstream of a second group of two cylinders, a third oxygen sensor positioned in the exhaust system downstream of a third group of two cylinders, a fourth oxygen sensor positioned in the exhaust system downstream of a fourth group of two cylinders; and a controller including executable instructions stored in non-transitory memory that cause the controller to adjust fuel injection into a second cylinder of the first group of cylinders in response to a second normalized fuel-air ratio error, where the second normalized fuel-air ratio error is based on a first normalized fuel-air ratio error for a first cylinder of the first group of cylinders and a second feedback correction value generated from an output of the first oxygen sensor produced while operating the internal combustion engine in an eight-cylinder mode. In a first example, the system includes where the first normalized fuel-air ratio error is based on a first feedback correction value generated from the output of the first oxygen sensor produced while operating the internal combustion engine in a four-cylinder mode. In a second example that may include the first example, the system includes where the first feedback correction value generated from the first oxygen sensor is based on a difference between a commanded fuel-air ratio and a fuel-air ratio determined via the first oxygen sensor. In a third example that may include one or both of the first and second examples, the system further comprises a second group of eight port fuel injectors, and where the first group of eight fuel injectors is comprised of eight direct fuel injectors. In a fourth example that may include one or more of the first through third examples, the system further comprises generating the first normalized fuel-air ratio error for a direct fuel injector of the first cylinder via activating the direct fuel injector of the first cylinder and deactivating a port fuel injector of the first cylinder. In a fifth example that may include one or more of the first through fourth examples, the system further comprises generating the first normalized fuel-air ratio error for the port fuel injector of the first cylinder via activating the port fuel injector of the first cylinder and deactivating the direct fuel injector of the first cylinder. In a sixth example that may include one or more of the first through fifth examples, the system further comprises additional executable instructions that cause the controller to adjust fuel injection into the first cylinder in response to a first normalized fuel-air ratio error, where the first normalized fuel-air ratio error is based on a first feedback correction value generated from the output of the first oxygen sensor produced while operating the internal combustion engine in a four-cylinder mode.

Figure 4:
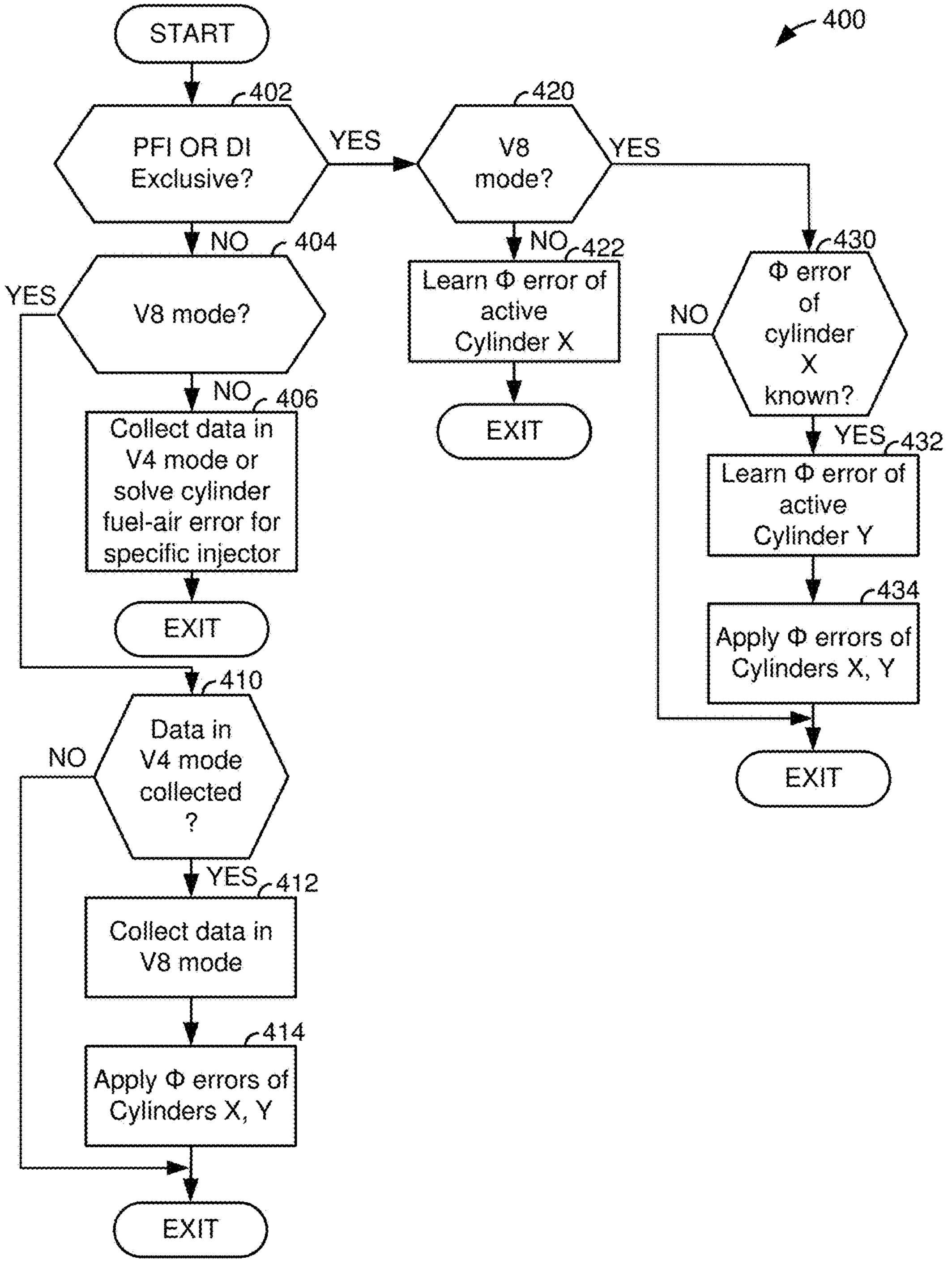
FIG. 4 shows a flowchart of an example method for operating an engine.

Referring now to FIG. 4, a method 400 for operating an engine and monitoring cylinder fuel-air ratios is shown. The method of FIG. 4 may be incorporated into the system of FIGS. 1-3 as executable instructions stored in non-transitory memory. The method of FIG. 4 may cause the controller shown in FIG. 1 to receive inputs from one or more sensors described herein and adjust positions or operating states of one or more actuators described herein in the physical world. Method 400 is described in terms of a sole pair of cylinders and a sole oxygen sensor monitoring the sole pair of cylinders, but method 400 may be applied to each cylinder pair that may be monitored via an oxygen sensor. Method 400 may be performed when an engine is operating and output of each oxygen sensor of the engine is being monitored via the controller.

At 402, method 400 judges whether or not the engine operates exclusively with port or direct fuel injectors. If method 400 judges that the engine operates exclusively with port or direct fuel injectors, the answer is yes and method 400 proceeds to 420. Otherwise, if method 400 judges that the engine operates with both port and direct fuel injectors, the answer is no and method 400 proceeds to 404.

At 420, method judges whether or not the engine is operating in V8 mode (e.g., rotating and combusting air and fuel in eight cylinders of the engine). If so, the answer is yes and method 400 proceeds to 430. Otherwise, the answer is no and method 400 proceeds to 422.

At 422, method 400 determines a normalized fuel-air ratio error for the activated cylinder (X) of a pair of cylinders (X,Y) that is monitored via an oxygen sensor (while the cylinder (Y) is deactivated), where X and Y are integer numbers of engine cylinders. Since method 400 has determined that the engine is operating in four-cylinder mode at step 422, method 400 determines a normalized fuel-air ratio error for the cylinder that is activated and monitored by a particular oxygen sensor.

For example, for the engine shown in FIG. 2A, where oxygen sensor 126 monitors exhaust gases from cylinders 1 (e.g., cylinder X) and 2 (e.g., cylinder Y), the oxygen sensor may be described as oxygen sensor 12, where the 1 indicates the number of the first cylinder that is being monitored via oxygen sensor 126 and 2 indicates the number of the second cylinder that is being monitored via oxygen sensor 126. Following a similar numbering convention, the normalized fuel-air ratio ($\phi$) error may be learned via the feedback correction value for oxygen sensor 12 when the engine is operated in V4 mode according to the following equation:

$$\epsilon_1 = -\Delta\phi_{fb-12(V4)} \quad \text{Eq. 1}$$

where E is the normalized fuel-air ratio error for cylinder number one and $-\Delta\phi_{fb-12(V4)}$ is the feedback correction for oxygen sensor 12 when the engine is operated in V4 mode. Operating the engine in V4 mode allows oxygen sensor 12 to sense gases output from cylinder one without influence from exhaust gases from cylinder two because cylinder two is not activated in V4 mode and its poppet valves may be held closed. The normalized fuel-air ratio ($\phi$) is equal to $1/\lambda$, where $\lambda$=AFR/AFRs, where AFR is the present cylinder air/fuel ratio, and AFRs is the stoichiometric air/fuel ratio for the fuel that is being combusted in the active cylinder.

By way of example, for the engine of FIG. 2A, if the commanded open-loop normalized fuel-air ratio for cylinder one is stoichiometric ($\phi$=1), and if cylinder one was running 5% leaner than the commanded open-loop nominal fuel-air ratio due to some error €1, the feedback control based on a fuel-air ratio determined from oxygen sensor 12 will increase the commanded ø by 5% (i.e., 5% rich feedback correction) from 1 to 1.05 (e.g., the open loop command plus the feedback correction) to compensate for $\epsilon_1$. The feedback correction is $\Delta\phi_{fb-12(V4)}$=0.05 in normalized fuel-air ratio units. The error $\epsilon_1$ is also in normalized fuel-air ratio ($\phi$) units and is equal to –0.05 (5% lean). Thus, $\epsilon_1=-\Delta\phi_{fb-12(V4)}$ for cylinder number one when the engine is operating in V4 mode. The error for other cylinders that are activated when the engine is operating in V4 mode may be determined in a similar way. Method 400 proceeds to exit.

At 430, method 400 judges whether or not the normalized fuel-air error for cylinder X of a pair of cylinders (X, Y) that are monitored by the oxygen sensor is known. If so, the answer is yes and method 400 proceeds to 432. Otherwise, the answer is no and method 400 proceeds to exit.

It may also be appreciated that method 400 may collect data in V8 mode followed by collecting data in V4 mode. The fuel-air ratios for the two cylinders that are monitored via the sole oxygen sensory may then be determined according to data collected during V8 and V4 modes.

At 432, method 400 determines a normalized fuel-air ratio for the activated cylinder (Y) of a pair of cylinders (X, Y) that is monitored via an oxygen sensor as the engine operates in V8 mode, given that the normalized fuel-air ratio for cylinder X has been determined. The normalized fuel-air ratio for cylinder Y may be determined via the following equation:

$$\frac{1}{2}\epsilon_1 + \frac{1}{2}\epsilon_2 = -\Delta\phi_{fb-12(V8)} \quad \text{Eq. 2}$$

where $\epsilon_2$ is the normalized fuel-air ratio error for the second cylinder that is being monitored via the sole oxygen sensor 12 and $-\Delta\phi_{fb-12(V8)}$ is the feedback correction for oxygen sensor 12 when the engine is operated in V8 mode. The value of $\epsilon_1$ and the value of $-\Delta\phi_{fb-12(V8)}$ as determined from the output of oxygen sensor 12 may be substituted into equation 2 to solve for $\epsilon_2$. Alternatively, equations one and two may be solved recursively. Method 600 proceeds to 434.

At 434, method 400 may apply the learned values $\epsilon_1$ and $\epsilon_2$. In one example, method 400 may adjust an amount of fuel injected into cylinder X (e.g., cylinder one) according to error $\epsilon_1$ and adjust an amount of fuel injected into cylinder Y (e.g., cylinder two) according to error $\epsilon_2$. Additionally, or alternatively, method 400 may determine if the value of $\epsilon_1$ exceeds a first threshold and/or if the value of $\epsilon_2$ exceeds a second threshold. If either error value exceeds its threshold, method 400 may indicate that a component or actuator that may affect cylinder fuel-air control may be degraded. Thus, the error values may be indicative of possible engine component degradation (e.g., a degraded fuel injector). Method 400 proceeds to exit.

At 404, method 400 judges whether or not the engine is operating in V8 mode. If so, the answer is yes and method 400 proceeds to 410. Otherwise, the answer is no and method 400 proceeds to 406.

At 406, method 400 collects the feedback correction values to controller memory (random access memory) to determine direct fuel injection and port fuel injection specific error values. The engine may be operated solely with direct fuel injectors and without port fuel injectors or solely with port fuel injectors and without direct fuel injectors to selectively decouple one fuel injection system from the determination of the normalized fuel-air ratio errors. In V4 mode, the normalized fuel-air ratio errors may be determined for cylinder number one to solve the following equations along with equations 7 and 8:

$$100\%\ DI \quad \epsilon_{1DI} = -\Delta\phi_{fb-12(V4-1)} \quad [V4\text{ mode}, f = 1] \quad \text{Eq. 3}$$

$$100\%\ PFI \quad \epsilon_{1PFI} = -\Delta\phi_{fb-12(V4-0)} \quad [V4\text{ mode}, f = 0] \quad \text{Eq. 4}$$

where $\Delta\phi_{fb-12(V4-1)}$ is the feedback correction value according to output of oxygen sensor 12 for operating the engine in V4 mode with solely direct fuel injection activated (port fuel injection is deactivated) and $\Delta\phi_{fb-12(V4-0)}$ is the feedback correction value according to output of oxygen sensor 12 for operating the engine in V4 mode with solely port fuel injection activated (direct fuel injection is deactivated). The variable f represents a fraction of direct fuel injection to the cylinders being monitored via a sole oxygen sensor. When f=0, direct fuel injection is deactivated and port fuel injection is activated (injecting fuel). When f=1, direct fuel injection is activated and port fuel is deactivated. Thus, (V4-1) indicates operating in V4 mode with direct fuel injection activated and port fuel injection deactivated, and (V4-0) indicates operating in V4 mode with direct fuel injection deactivated and port fuel injection activated.

Alternatively, at step 406, method 400 may operate with port fuel injection and direct fuel injection while collecting data to controller memory (e.g., random access memory) to solve for direct fuel injection related fuel-air ratio errors and port fuel injection related fuel-air ratio errors. During situations when method 400 operates with port fuel injection and direct fuel injection, method 400 may monitor and capture to memory direct fuel injection fractions $f_c$ and $f_d$ along with fuel-air ratio correction values $\Delta\phi_{fb-12(V4-c)}$ and $\Delta\phi_{fb-12(V4-d)}$ to solve the following equations in combination with solving equations 9 and 10:

$$f_c\epsilon_{1DI} + (1 - f_c)\epsilon_{1PFI} = -\Delta\phi_{fb-12(V4-c)} \quad \text{Eq. 5}$$

$$f_d\epsilon_{1DI} + (1 - f_d)\epsilon_{1PFI} = -\Delta\phi_{fb-12(V4-d)} \quad \text{Eq. 6}$$

where $f_c$ is a direct fuel injection fuel fraction at a first engine operating condition, $\Delta\phi_{fb-12(V4-c)}$ is the normalized feedback fuel-air correction for operating the engine in V4 mode with direct fuel injection fuel fraction $f_c$, $f_d$ is a direct fuel injection fuel fraction at a second engine operating condition, and $\Delta\phi_{fb-12(V4-d)}$ is the normalized feedback fuel-air correction for operating the engine in V4 mode with direct fuel injection fuel fraction $f_d$. Method 400 proceeds to exit.

At 410, method 400 judges whether or not method 400 has captured data from V4 operating mode to controller memory. If so, the answer is yes and method 400 proceeds to 412. Otherwise, the answer is no and method 400 proceeds to exit.

In some alternative examples, method 400 may be allowed to proceed to step 412 to capture data from operating the engine in V8 mode to controller memory before capturing data in V4 mode to controller memory.

At 412, method 400 collects the feedback correction values to controller memory (random access memory) to determine direct fuel injection and port fuel injection specific error values. The engine may be operated solely with direct fuel injectors and without port fuel injectors or solely with port fuel injectors and without direct fuel injectors to selectively decouple one fuel injection system from the determination of the normalized fuel-air ratio errors. In V8 mode, the normalized fuel-air ratio errors may be determined via the following equations:

$$100\%\ DI\quad 0.5\epsilon_{1DI}+0.5\epsilon_{2DI}=-\Delta\phi_{fb-12(V8-1)}\quad [V8\text{ mode}, f=1]\qquad \text{Eq. 7}$$

$$100\%\ PFI\quad 0.5\epsilon_{1PFI}+0.5\epsilon_{2DI}=-\Delta\phi_{fb-12(V8-0)}\quad [V8\text{ mode}, f=0]\qquad \text{Eq. 8}$$

where $\Delta\phi_{fb-12(V8-1)}$ is the feedback correction value according to output of oxygen sensor 12 for operating the engine in V8 mode with solely direct fuel injection activated (port fuel injection is deactivated) and $\Delta\phi_{fb-12(V8-0)}$ is the feedback correction value according to output of oxygen sensor 12 for operating the engine in V8 mode with solely port fuel injection activated (direct fuel injection is deactivated). The variable f represents a fraction of direct fuel injection to the cylinders being monitored via a sole oxygen sensor. When f=0, direct fuel injection is deactivated and port fuel injection is activated (injecting fuel). When f=1, direct fuel injection is activated and port fuel is deactivated. Thus, (V8-1) indicates operating in V8 mode with direct fuel injection activated and port fuel injection deactivated, and (V8-0) indicates operating in V8 mode with direct fuel injection deactivated and port fuel injection activated. Equation 7 may be solved via substituting the value of $\epsilon_{1DI}$ from equation 3 into equation 7 or recursively solving equations 3 and 7 together.

Alternatively, at step 412, method 400 may operate with port fuel injection and direct fuel injection while collecting data to controller memory (e.g., random access memory) to solve for direct fuel injection related fuel-air ratio errors and port fuel injection related fuel-air ratio errors. During situations when method 400 operates with port fuel injection and direct fuel injection, method 400 may monitor and capture to memory direct fuel injection fractions $f_a$ and $f_b$ along with fuel-air ratio correction values $\Delta\phi_{fb-12(V8-a)}$ and $\Delta\phi_{fb-12(V8-b)}$ to solve the following equations:

$$x_1 f_a\epsilon_{1DI}+x_1(1-f_a)\epsilon_{1PFI}+x_2 f_a\epsilon_{2DI}+x_2(1-f_a)\epsilon_{2PFI}=-\Delta\phi_{fb-12(V8-a)}\qquad \text{Eq. 9}$$

$$x_1 f_b\epsilon_{1DI}+x_1(1-f_b)\epsilon_{1PFI}+x_2 f_b\epsilon_{2DI}+x_2(1-f_b)\epsilon_{2PFI}=-\Delta\phi_{fb-12(V8-b)}\qquad \text{Eq. 10}$$

where $f_a$ is a direct fuel injection fuel fraction at a third engine operating condition, $\Delta\phi_{fb-12(V8-a)}$ is the normalized feedback fuel-air correction for operating the engine in V8 mode with direct fuel injection fuel fraction $f_a$, $f_b$ is a direct fuel injection fuel fraction at a fourth engine operating condition, and $\Delta\phi_{fb-12(V8-b)}$ is the normalized feedback fuel-air correction for operating the engine in V8 mode with direct fuel injection fuel fraction $f_b$. $x_1$ and $x_2$ are the relative oxygen amounts of cylinders 1 and 2 (respectively) as sensed by oxygen sensor 12 (e.g., $x_1=x_2=0.5$ if oxygen sensor 12 senses cylinders 1 and 2 equally). Equations 9 and 10 may be solved recursively along with equations 5 and 6. Method 400 proceeds to 414.

At 414, method 400 may apply the learned values $\epsilon_{1DI}$, $\epsilon_{2DI}$, $\epsilon_{1PFI}$, $\epsilon_{2PFI}$. In one example, method 400 may adjust an amount of fuel injected into cylinder X (e.g., cylinder one) according to error $\epsilon_{1DI}$ and $\epsilon_{1PFI}$. Further, method 400 may adjust an amount of fuel injected into cylinder Y (e.g., cylinder number two) according to error $\epsilon_{2DI}$ and $\epsilon_{2PFI}$. Additionally, or alternatively, method 400 may determine if the value of $\epsilon_{1DI}$ exceeds a first threshold, $\epsilon_{1PFI}$ exceeds a second threshold, $\epsilon_{2DI}$ exceeds a third threshold, and/or if the value of $\epsilon_{2PFI}$ exceeds a fourth threshold. If these error value exceed their respective threshold, method 400 may indicate that a component or actuator that may affect cylinder fuel-air control may be degraded. Thus, the error values may be indicative of possible engine component degradation (e.g., a degraded fuel injector). Method 400 proceeds to exit.

Although method 400 describes determining cylinder normalized fuel-air ratio errors for an eight-cylinder engine, the method may also be extended to four and six-cylinder engines where a sole oxygen sensor monitors gases output from two cylinders of an engine. Further, method 400 is applicable to engines having cross-plane crankshafts. Further still, method 400 is operable for direct injection engines, port fuel injection engines, and engines that have both port and direct fuel injection.

Thus, the method of FIG. 4 provides for a method for operating an engine, comprising: operating the engine in a four-cylinder mode and generating a first normalized fuel-air ratio error for a first cylinder via a first feedback correction value generated from an oxygen sensor output produced while operating the engine in the four-cylinder mode; operating the engine in an eight-cylinder mode and generating a second normalized fuel-air ratio error for a second cylinder via the first normalized fuel-air ratio error and a second feedback correction value generated from the oxygen sensor output produced while operating the engine the eight-cylinder mode; and adjusting output of one or more fuel injectors in response to the first normalized fuel-air ratio error or the second normalized fuel-air ratio error. In a first example, the method includes where the engine is a direct fuel injection engine. In a second example that may include the first example, the method includes where the engine is a port fuel injected engine. In a third example that may include one or both of the first and second examples, the method includes where the engine is port fuel injected engine and a direct fuel injected engine. In a fourth example that may include one or more of the first through third examples, the method includes where in the eight-cylinder mode each engine oxygen sensor senses a total of two cylinders. In a fifth example that may include one or more of the first through fourth examples, the method includes where the engine includes a cross plane crankshaft. In a sixth example that may include one or more of the first through fifth examples, the method includes where the oxygen sensor output produced while operating the engine in four-cylinder mode is generated from a same oxygen sensor from which the second feedback correction value is generated. In a seventh example that may include one or more of the first through sixth examples, the method includes where the first feedback correction value generated from the oxygen sensor output is based on a difference between a commanded fuel-air ratio and a fuel-air ratio determined via the oxygen sensor output.

The method of FIG. 4 also provides for a method for operating an engine, comprising: adjusting an amount of fuel injected to a first cylinder of the engine in response to solving a system of equations including a first equation based on operating the engine in a four-cylinder mode and a second equation based on operating the engine in an eight-cylinder mode. In a first example, the method further comprises adjusting an amount of fuel injected to a second cylinder of the engine in response to solving the system of equations. In a second example that may include the first example, the method further comprises solving the system of equations based on operating the engine solely with direct fuel injection. In a third example that may include one or both of the first and second examples, the method further comprises solving the system of equations based on operating the engine solely with port fuel injection. In a fourth example that may include one or more of the first through third examples, the method further comprises solving the system of equations based on operating the engine with port fuel injection and direct fuel injection.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions May graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:

operating the engine in a four-cylinder mode and generating a first normalized fuel-air ratio error for a first cylinder via a first feedback correction value generated from an oxygen sensor output produced while operating the engine in the four-cylinder mode;

operating the engine in an eight-cylinder mode and generating a second normalized fuel-air ratio error for a second cylinder via the first normalized fuel-air ratio error and a second feedback correction value generated from the oxygen sensor output produced while operating the engine the eight-cylinder mode; and adjusting output of one or more fuel injectors in response to the first normalized fuel-air ratio error or the second normalized fuel-air ratio error.

2. The method of claim 1, where the engine is a direct fuel injection engine.

3. The method of claim 1, where the engine is a port fuel injected engine.

4. The method of claim 1, where the engine is port fuel injected engine and a direct fuel injected engine.

5. The method of claim 4, further comprising generating the first normalized fuel-air ratio error for a direct fuel injector of the first cylinder via activating the direct fuel injector of the first cylinder and deactivating a port fuel injector of the first cylinder.

6. The method of claim 4, further comprising generating the first normalized fuel-air ratio error for a port fuel injector of the first cylinder via activating the port fuel injector of the first cylinder and deactivating a direct fuel injector of the first cylinder.

7. The method of claim 1, where in the eight-cylinder mode each engine oxygen sensor senses a total of two cylinders.

8. The method of claim 1, where the engine includes a cross plane crankshaft.

9. The method of claim 1, where the oxygen sensor output produced while operating the engine in four-cylinder mode is generated from a same oxygen sensor from which the second feedback correction value is generated.

10. The method of claim 1, where the first feedback correction value generated from the oxygen sensor output is based on a difference between a commanded fuel-air ratio and a fuel-air ratio determined via the oxygen sensor output.

* * * * *